United States Patent [19]

Holland et al.

[11] Patent Number: 4,586,633

[45] Date of Patent: May 6, 1986

[54] VENDING MACHINE STORAGE RACK ASSEMBLY

[75] Inventors: Charlie R. Holland, St. Louis; Michael J. DelPercio, Fenton, both of Mo.

[73] Assignee: Coin Acceptors, Inc., St. Louis, Mo.

[21] Appl. No.: 482,729

[22] Filed: Apr. 7, 1983

[51] Int. Cl.[4] .............................................. B65G 59/00

[52] U.S. Cl. .................................... 221/257; 221/281; 211/49.1; 221/67

[58] Field of Search ............... 221/124, 255, 256, 257, 221/266, 251, 295, 281, 67; 211/490, 59.1; 312/45, 42, 49, 72

[56] References Cited

U.S. PATENT DOCUMENTS 1,619,006 3/1927 Vaughan ............................ 221/266
2,956,660 10/1960 Nordquist ........................... 211/281
3,144,113 8/1964 Peterson ............................. 221/266
4,287,992 9/1981 Takemori ......................... 211/49 D

FOREIGN PATENT DOCUMENTS 1560170 1/1980 Japan ................................ 211/49 D

*Primary Examiner*—Joseph J. Rolla
*Assistant Examiner*—Kenneth Noland
*Attorney, Agent, or Firm*—Cohn, Powell & Hind

[57] ABSTRACT

This dispensing machine rack assembly is formed from a pair of complementary, individually molded rack portions interconnected in face-to-face relation to define a plurality of generally vertical container-receiving compartments. Each rack portion includes a plurality of vertically spaced ramps extending beyond the connection face of the racks and disposed in staggered, overlapping relation to the ramps of the other rack portion to provide a serpentine path for the containers. A container entry opening is provided at the upper end of the rack assembly and a container dispensing opening is provided at the lower end of the rack assembly. Each lower end opening is provided with a door having a container-receiving bin and a control means associated with the door to control movement of a container from the lower ramp into the bin. A cradle is provided in each compartment associated with the lower ramp assembly, the cradle rear end selectively engaging a follower container when the cradle front end is loaded with a leading container.

14 Claims, 12 Drawing Figures

VENDING MACHINE STORAGE RACK ASSEMBLY

BACKGROUND OF THE INVENTION

This invention relates generally to vending machines and particularly to a rack assembly for storing beverage containers within the vending machine.

Conventional vending machines for dispensing articles such as beverage container cans are large free-standing units which dispense one article from a plurality of serpentine stacks into a single open dispensing compartment. The stacks of such units are generally of wire frame and are particularly complicated and therefore expensive because they are formed from welded wire or metal as individual units. The present rack assembly overcomes these and other deficiencies.

SUMMARY OF THE INVENTION

The present rack assembly is particularly adapted for use within a relatively light weight small machine that is wall mounted or can stand on a counter top. The vending machine provides a plurality of compartments and is adapted to deliver one container from each compartment as desired.

This rack assembly provides first and second interconnected molded rack portions. The first rack portion includes a pair of upright frame members and a plurality of ramp means disposed in spaced vertical relation, each having an inwardly projecting downwardly inclined upper face. The second rack portion also includes a pair of upright frame members and a plurality of ramp means disposed in spaced vertical relation each having an inwardly projecting downwardly inclined upper face. The rack portions are connected in face-to-face relation with the ramp means of one rack being disposed in overlapping, staggered relation to the ramp means of the other rack to define a container-receiving compartment providing a serpentine path for the containers from an entry opening at the upper end to a dispensing opening at the lower end.

In one aspect of the invention the first rack portion includes a lower ramp means having a container-engageable cradle which selectively permits and precludes forward movement of the containers into the dispensing area.

In yet another aspect of the invention the cradle includes a container-carrying bearing portion disposed forwardly of the cradle pivot axis and a container-engageable stop portion disposed rearwardly of the pivot axis, said cradle including biasing means tending to move the stop portion out of container engagement when the bearing portion is relieved of container load, said stop portion tending to move into container engagement when the cradle bearing portion is under container load.

In still another aspect of the invention the first and second rack portions include interengageable contact faces and the ramp means of each rack extends beyond its associated contact face and into the other rack portion.

In another aspect of the invention the second rack portion includes an upper guide platform disposed between the upright frame members and above the rack members, said rack portion being spaced from the first rack portion to provide the container entry opening.

In yet another aspect of the invention the first rack portion and the second rack portion each include at least one intermediate frame member to provide a plurality of container-receiving compartments each having a plurality of ramp means, the ramp means of the first and second rack portions being disposed in overlapped, staggered relation.

In another aspect of the invention the rack portion frame members include outwardly extending container retaining means disposed in vertically spaced relation between the ramp means for precluding sideways movement of the containers.

In still another aspect of the invention the rack portions include outwardly disposed generally vertical container retainer means disposed in spaced vertical relation between the ramp means for precluding outward movement of the containers.

In yet another aspect of the invention a face plate is provided between the lower ends of the first and second rack portions, said face plate including a door opening. A door is hinged to the face plate below the opening, said door having a bottom member and a side member defining a container-receiving bin, the door being selectively movable between an open and closed position. Stop means is provided, actuated by the door, to selectively engage a container on the lower ramp while the door is in the open position thereby precluding passage of said container into the bin, said stop means being movable into a second position when the door is in the closed position to permit passage of the container into the bin.

BRIEF DESCRIPTION OF THE DRAWINGS

FIG. 11 is a similar view showing the cradle in another operative position, and.

DESCRIPTION OF THE PREFERRED EMBODIMENT

Figure 1:
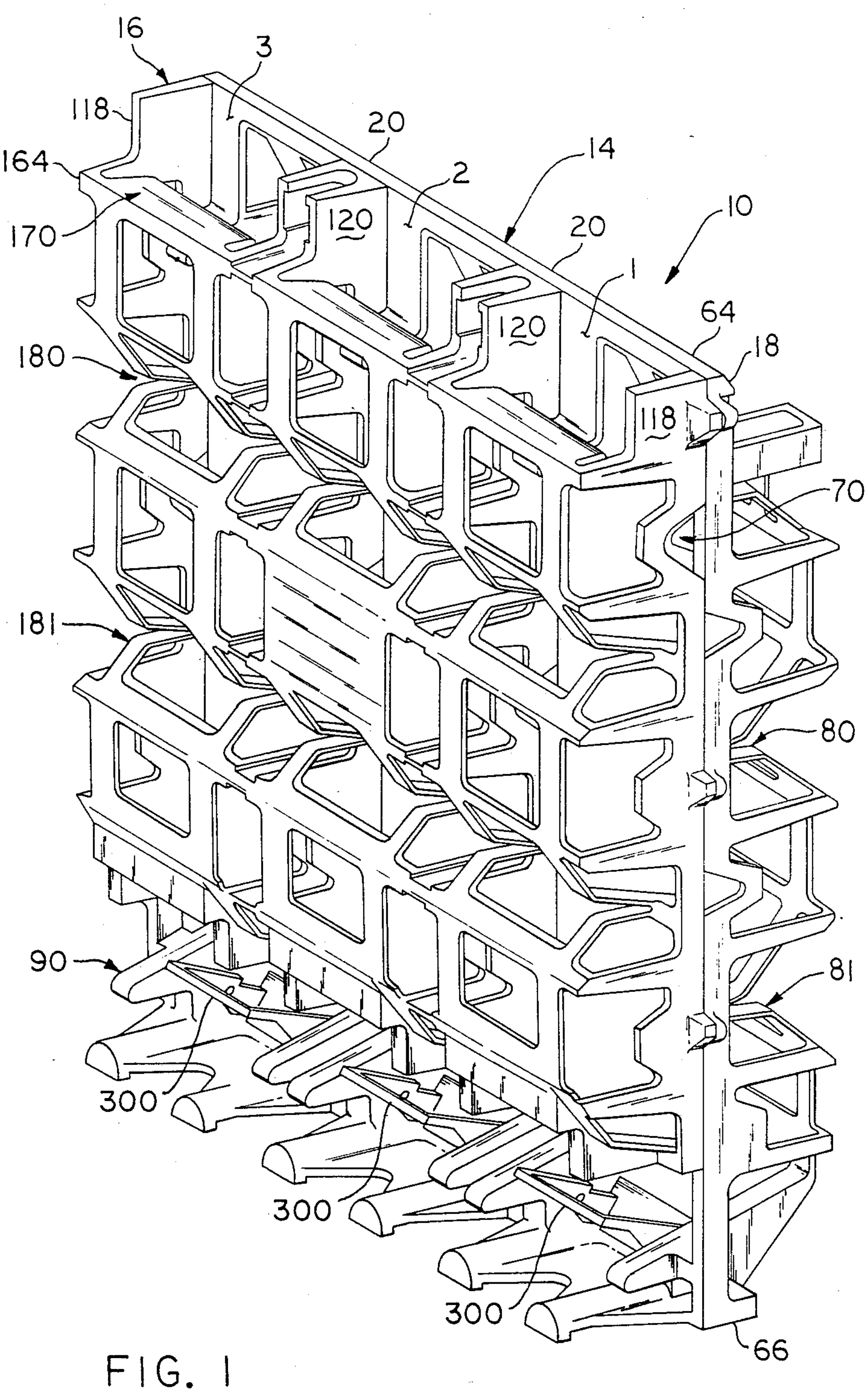
FIG. 1 is a perspective view of the assembled dispensing rack assembly.
Figure 2:
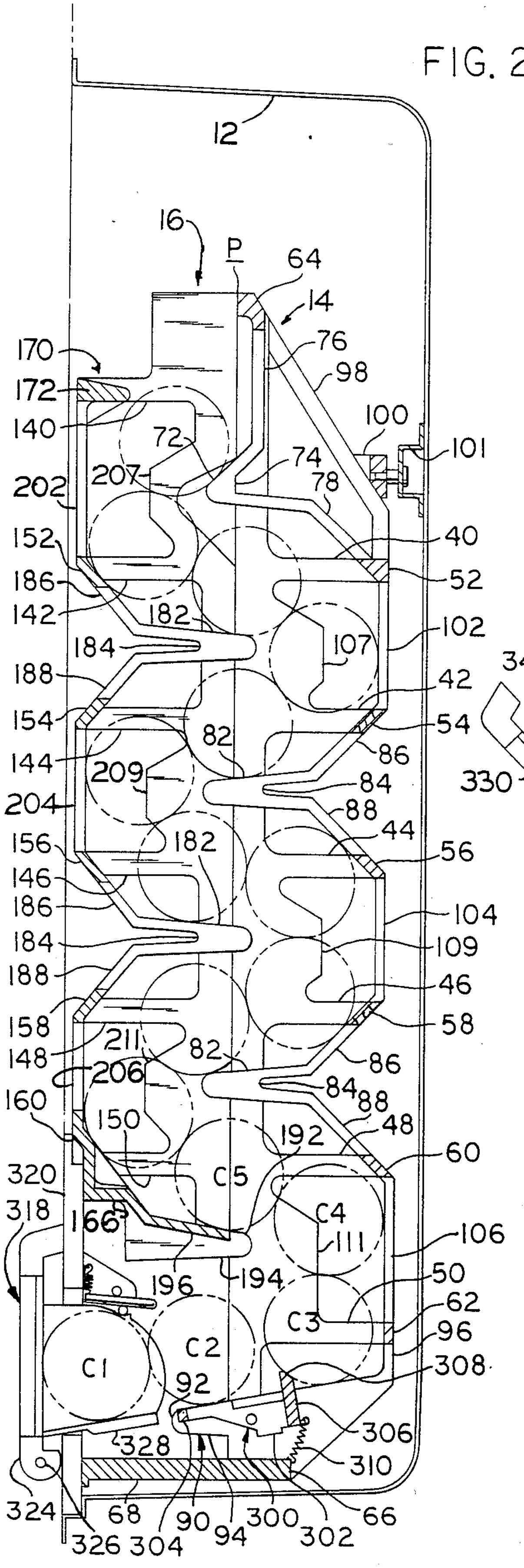
FIG. 2 is a longitudinal cross sectional view of the rack assembly mounted to a cabinet housing.
Figure 3:
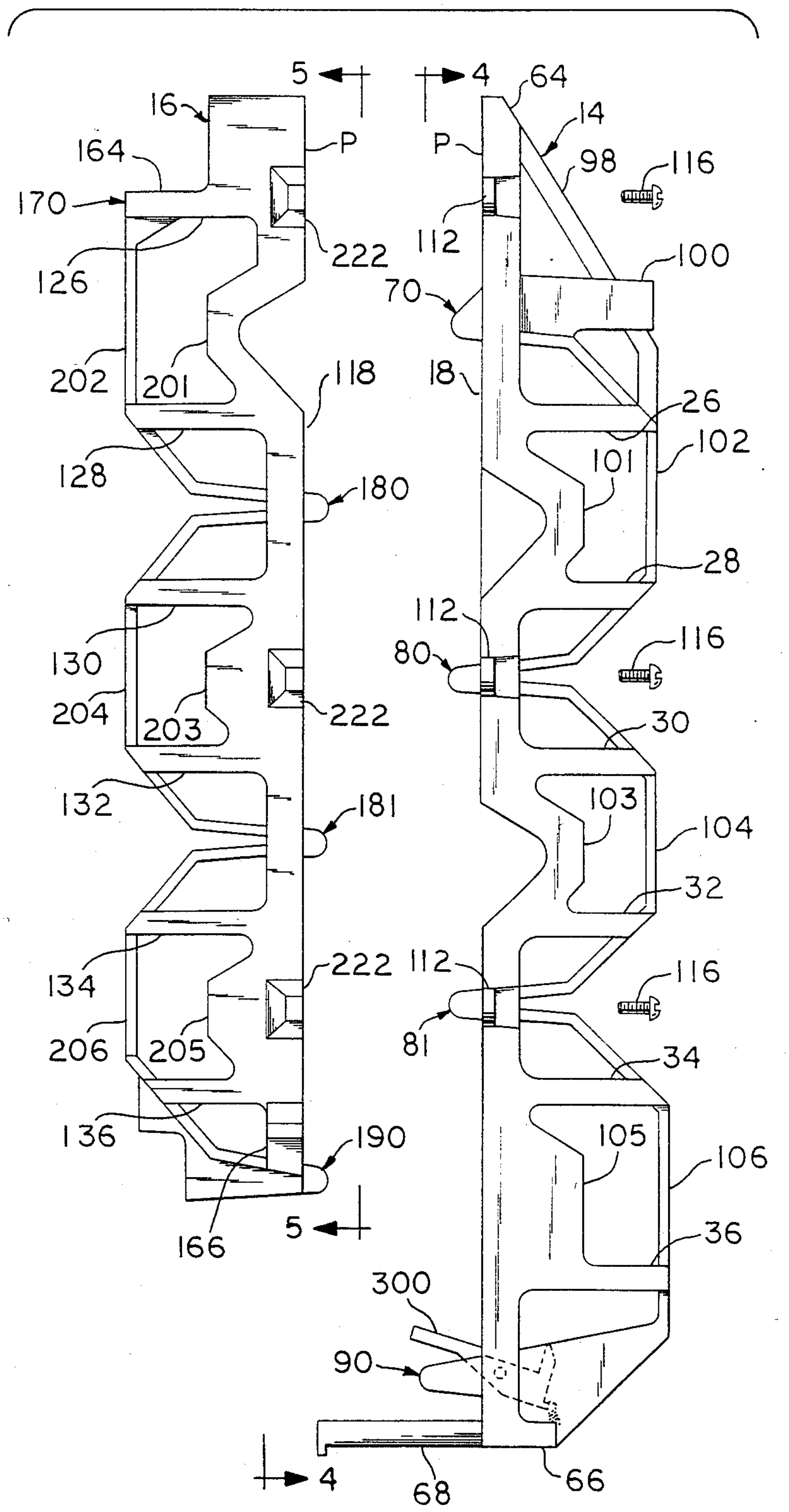
FIG. 3 is an exploded end view of the two portions of the rack assembly.

Referring now by reference numerals to the drawings and first to FIGS. 1 through 3 it will be understood that the rack assembly 10, which is mounted in a cabinet 12, providing a housing, includes interconnected first and second molded plastic rack portions 14 and 16 disposed in face to face relation. When assembled, as shown in FIG. 1, the first and second rack portions define three substantially similar vertical compartments 1, 2 and 3 adapted to receive articles which in the embodiment shown are cans or similar beverage containers indicated by C.

The first rack portion 14, which is best understood by reference to FIGS. 2–4, 6 and 7, includes opposed elongate side frame members 18 and a pair of elongate intermediate frame members 20 having a generally U-shaped configuration providing leg portions 22 and a bight portion 24. As shown in FIG. 3, the side members 18 include a plurality of outstanding arms 26–36 and as shown in FIG. 2 the intermediate frame members 20 include a plurality of opposed pairs of outstanding arms 40–50 attached to the intermediate frame legs 22 and being generally in transverse register with the outstanding arms of the side frame members 18.

Figure 4:
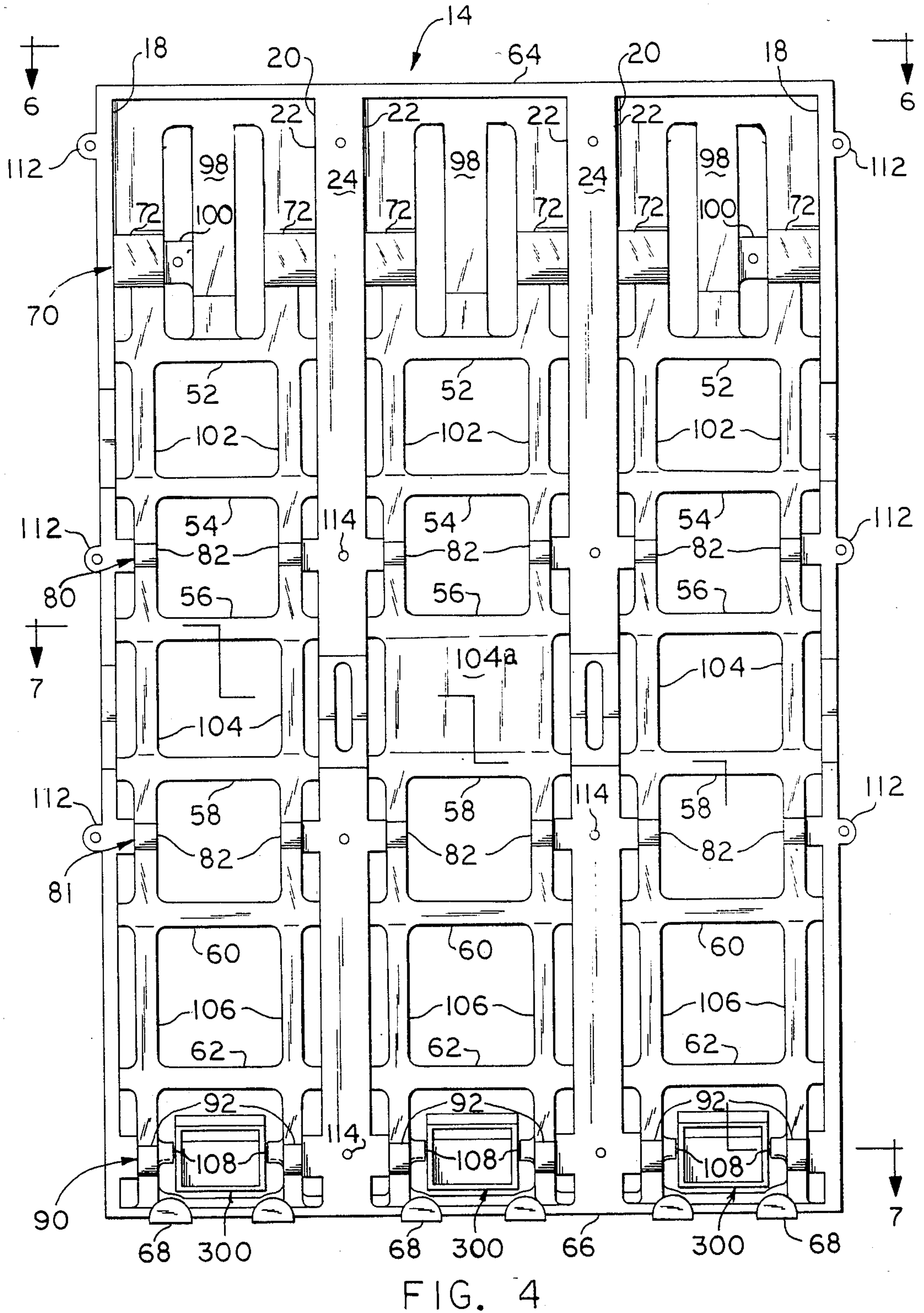
FIG. 4 is an elevational view taken on line 4—4 of FIG. 3.

As shown in FIG. 4, the side frame area 26–36 are connected to adjacent intermediate frame arms 40–50 by cross members 52–62 respectively and the intermediate frame arms 40–50 adjacent each other are likewise connected by cross members 52–62 respectively. The first rack portion 14 also includes upper cross frame members 64 and lower base frame members 66, the base frame members 66 having projecting cantilever arms 68 which provide a connection to front plate, as will be described, to which the first and second portions 14 and 16 are connected.

Importantly, the first rack portion 14 includes a plurality of upper, lower and intermediate generally horizontal ramp means 70, 80, 81 and 90. In the preferred embodiment, the upper ramp means 70 includes transversely aligned opposed pairs of ramp members 72. As shown in FIG. 2, each of the ramp members includes a nose portion 74, attached to an associated upright frame members 18 or 20, and upper and lower bracing members 76 and 78 connecting the nose portion 74 to the upper cross members 64 and a cross member 52 respectively. As shown clearly in FIG. 2 the nose portion 74 projects forwardly beyond the generally planar connection surface of the rack assembly indicated by P said connection contact surfaces defining the inner portion of the frame members.

The intermediate ramp assemblies 80 and 82 include opposing pairs of ramp members 82 attached to associated frame members, each having a nose portion 84 and upper and lower bracing elements 86 and 88, the nose portions 84 of upper ramp assembly 80 being connected to cross members 54 and 56 respectively by said bracing elements and the nose portions 84 of ramp assembly 81 being connected to cross members 58 and 60 respectively. The lower ramp assembly 90 includes opposed pairs of ramp members 92, attached to associate frame members, each having a nose portion 94 and upper bracing elements 96 attached to cross members 62.

The upper cross member 64 and the cross members 52 are interconnected by diagonal bracing members 98 to provide the rack portion 14 with additional stiffness, and brackets 100 are provided by which the rack portion 14 is attached to the cabinet 12.

To complete the latticework structure of the first rack portion 14, cross members 52–54 are interconnected by a plurality of vertical members 102; cross members 56 and 58 are interconnected by vertical members 104 and a center panel portion 104*a*, and cross members 60 and 62 are interconnected by vertical members 106. The vertical members 102, 104 and 106 define the rear face of the rack portion 14 and provide a retaining means for the container C precluding outward movement thereof.

In order to retain the containers C within the container compartments 1, 2 and 3 the first rack side members 118 are provided with outstanding flanges 101, 103 and 105 and the corresponding intermediate member legs 22 are provided with similar flanges 107, 109 and 111 to perform the same function, said flanges providing container end retaining means precluding sideways movement of said containers.

Importantly, the lower ramp assembly 90 includes opposed pairs of stub axles 108 which are attached to nose portions 94 and provide a mounting for cradle members 300 which are provided at the lower end of each of the rack compartments 1, 2 and 3 as shown in FIG. 1 which will be described in greater detail below.

As shown in FIG. 4, the first rack portion side members include a plurality of apertured lugs 112 and the intermediate members 20 include a plurality of apertures 114 by which the first and second rack portions 14 and 16 are connected as by fasteners 116. As will be described the second rack portion is provided with corresponding blind holes.

Figure 5:
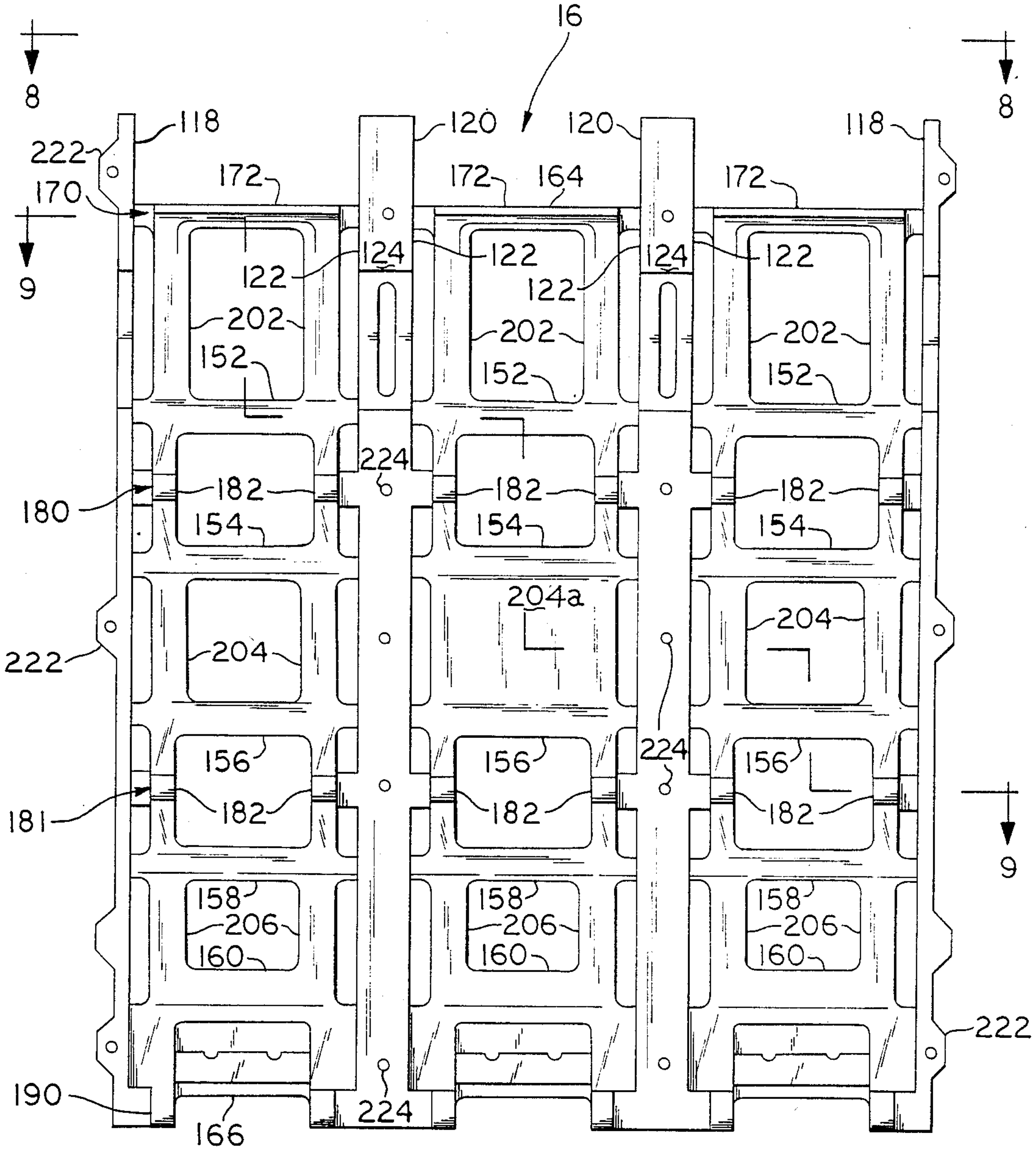
FIG. 5 is an elevational view taken on line 5—5 of FIG. 3.
Figure 8:
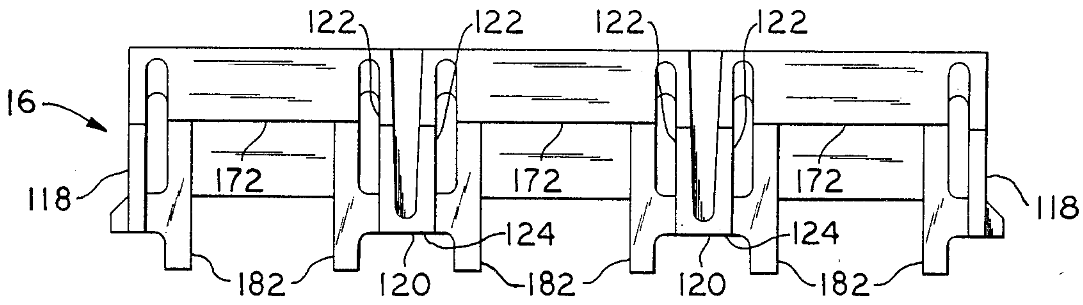
FIG. 8 is a plan view taken on line 8—8 of FIG. 5.
Figure 6:
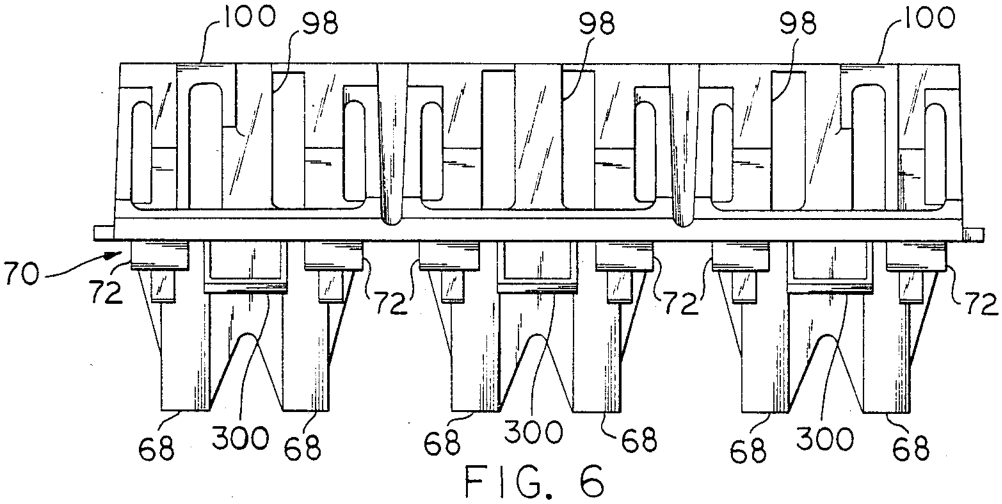
FIG. 6 is a plan view taken on line 6—6 of FIG. 4.
Figure 7:
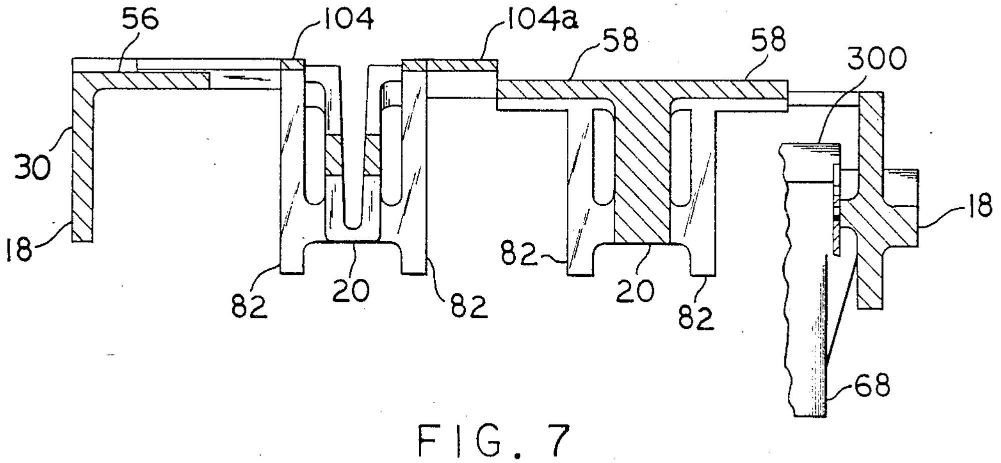
FIG. 7 is a cross sectional view taken on line 7—7 of FIG. 4.
Figure 9:
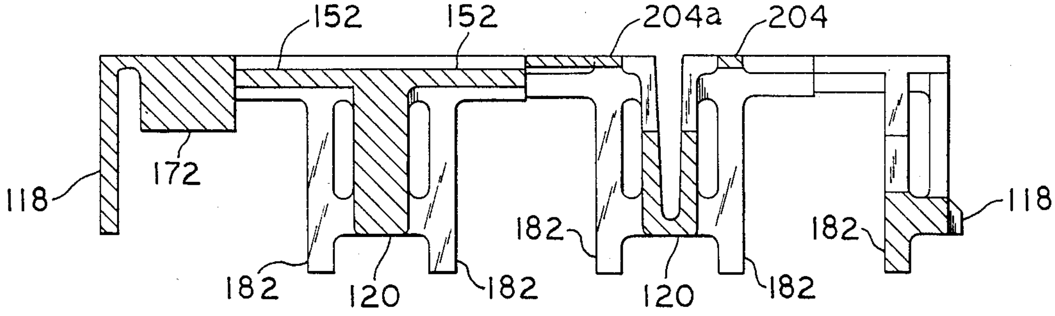
FIG. 9 is a cross sectional view taken on line 9—9 of FIG. 5.

The second rack portion 16 has a structural arrangement of parts which is generally complementary to the first rack portion 14 and is best understood by reference to FIGS. 2, 3 and 5 and FIGS. 8 and 9. As shown in FIG. 5 the second rack portion 16 incudes opposed elongate side frame members 118 and elongate intermediate frame members 120 having a generally U-shaped configuration providing leg portions 122 and a bight portion 124. As shown in FIG. 3, the side frame members 118 include a plurality of outstanding arms 126–136 and, as shown in FIG. 2, the intermediate frame members 120 include a plurality of opposed pair of outstanding arms 140–150 attached to intermediate frame legs 122 and being generally in register with the outstanding arms of the side frame members 118.

As shown in FIG. 5, the side frame arms 128–136 are connected to adjacent intermediate frame arms 140–150 by cross members 152–160 respectively and the intermediate frame arms 142–150 are likewise connected by cross members 152–160. The second rack portion 16 also includes upper cross frame members 164 and lower cross frame members 166. The upper frame member 164 includes a guide assembly 170 which provides a plurality of guide platform members 172, said platform members being spaced from the face of the first rack portion 14 and cooperating with the first rack portion 14 to define an entry opening for associated container compartments 1, 2 and 3. Importantly, the second rack portion 16 also includes a plurality of intermediate and lower generally horizontal ramp assemblies 180, 181 and 190. As shown in FIG. 2, the intermediate ramp assemblies 180 and 181 each includes opposed pairs of ramp members 182 having a nose portion 184 attached to adjacent side frame members 118 or intermediate side frame member 120 and upper and lower bracing elements 186 and 188 connecting the nose portion 84 to cross members 152 and 154 respectively or 156 and 158 respectively. The lower ramp assembly 190 includes opposed pairs of ramp elements 192, attached to associated frame members, each of which is provided with a nose portion 194 and upper bracing elements 196 attached to cross members 160.

As shown clearly in FIG. 2 the nose portions project forwardly beyond the general planar surface of the rack portion 16 indicated by P which defines the inner portions of the frame members and the upper platform and said nose portions each includes an upper container-receiving inclined face.

To complete the latticework structure of the second rack portion 16, cross members 154 and 156 are interconnected by vertical members 204 and a center panel portion 204a. The upper cross member 164 is connected to cross members 152 by vertical members 202 and the cross members 160 are connected to cross member 158 by vertical members 206. The vertical members 102, 204 and 206 define the rear face of the rack portion 14 and provide a retaining means for the containers C.

In order to retain the containers C within the container compartments 1, 2 and 3, the second rack side frame members 118 include outstanding flanges 201, 203 and 205 while the corresponding intermediate frame member 120 include corresponding outstanding flanges 207, 209 and 211 said flanges providing container end retaining means.

The second rack portion side members 118 include a plurality of lugs 222 having blind holes and the intermediate members 120 include a plurality of blind holes 224. Because of this structural arrangement of parts the two rack portions are readily connected together in face to face engagement by means of fasteners 116.

The cradle members 300 are best understood by reference to FIGS. 1, 2 and 4 each cradle member including apertured side arms 302 by which said members 300 are pivotally mounted to stub axles 108. The side arms 302 are connected at the forward end by a cross bar 304 and at the rearward end by an upwardly extending cross bar 306 having a beveled stop face 308. A tension spring 310 is connected between the rear cross bar 306 and the rack cross member 66 tending to bias the front end of the side arms upwardly. As shown in FIG. 2 the front end of the cradle member 300 is depressed by the weight of a container C2 such that the rear cross bar 306 projects upwardly into engagement with the container C3 next in line. Because of this structural arrangement of parts the weight of said container C3 and the containers C4, C5 etc. above the container C3 is not transmitted to the two forward containers C1 and C2. The cradle member 300 facilitates the dispensing of the containers which will be described in greater detail below. A vending machine having a dispensing means of this general type is disclosed in our copending applications Ser. No. 451,454 filed Dec. 10, 1982 and Ser. No. 451,035 filed Dec. 20, 1982 disclosures of which are hereby incorporated herein by reference.

Figure 10:
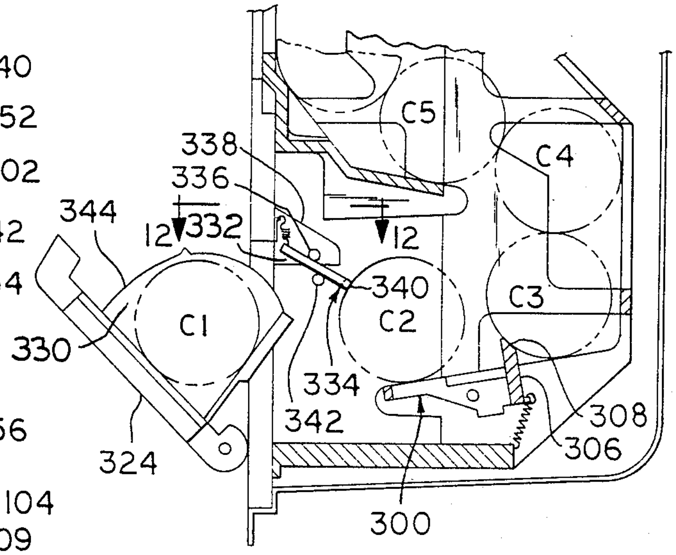
FIG. 10 is a fragmentary view illustrating the cradle in one operative position.
Figure 11:
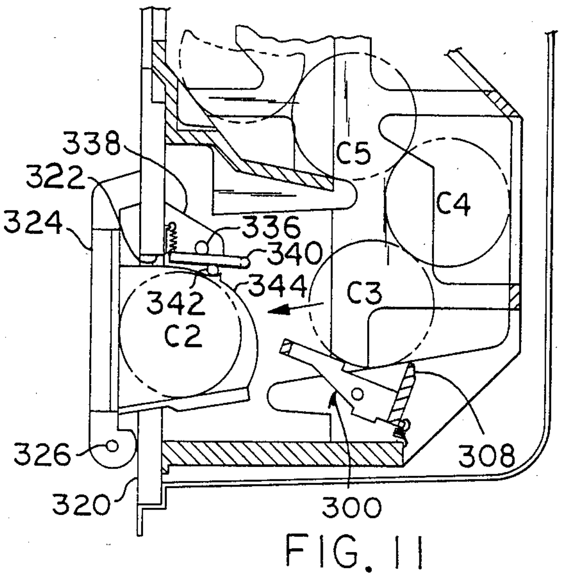

The container dispensing means 318 for the rack assembly 10 is best shown in FIGS. 2, 10 and 11. As shown, the dispensing assembly includes a front or face plate 320 attached between the cantilever arms 68 of the first rack portion 14 and the cross member 160 of the second rack portions as by fasteners, not shown. The plate 320 includes a plurality, a total of three in the embodiment disclosed, of door openings 322 said openings being disposed in spaced horizontal alignment each opening being provided with a door 324 and communicating with one of the compartments 1, 2 and 3. Each door 324 is mounted to the front plate 320 below its associated door opening respectively by a hinge connection 326 and is movable selectively from a closed position to an open position.

Each door includes a bottom plate providing a shelf 328 extending inwardly of its associated opening 322 and sidewalls 330 which cooperate with the rear face of the door to provide a bin for holding the cylindrical container to be dispensed.

As discussed above the rack assembly 10 provides serpentine feed means adapted to retain the containers C, and to feed them under gravity in a controlled manner, in sequence, one by one into the bin of the door 324.

Figure 12:
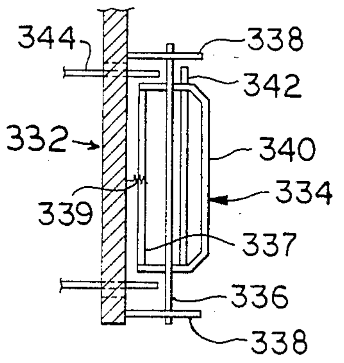
FIG. 12 is a fragmentary view taken on line 12—12 of FIG. 10 showing the upper cradle.

A control means generally indicated by 332 is provided adjacent each opening 322. The control means, best shown in FIG. 12, is movable from a first position (FIGS. 2 and 11) to a second position (FIG. 10). In the first position when the door 324 is fully closed, the disposition of the control means allows transfer of a container from the lower ramp assembly 90 to the bin. In the second position when the door 324 is moved into its open position, the disposition of the control means blocks transfer of a container seated on the ramp assembly 90.

In the embodiment shown, the control means 332 includes an upper cradle 334 having a transverse pivot rod 336, mounted between laterally spaced brackets 338 attached to the rear face of the front plate 320. The cradle 334 also includes a forwardly disposed transverse rod 340 extending between the feed means and the door bin, and adapted to engage and hold the container C seated on the ramp assembly 90 and preclude transfer of the container to the door bin until the door 324 is fully closed. Connected to a rearwardly disposed rod 337 of the upper cradle 334 is a tension spring 339, constituting a resilient means, that tends to pivot the cradle 334 and urge the container-engageable transverse rod 340 into the path of the container to preclude transfer from the ramp assembly 90.

In order to provide movement of the control means 332 the cradle 334 includes an actuating rod 342 disposed between the pivot rod 336 and rod 340. An operating means for the cradle 332 is provided which selectively interconnects the cradle 332 and the door 324 to allow loading of the door bin when the door is in its closed position, and to preclude loading of the bin when the door 324 is moved from its closed position. The operating means in the embodiment shown is provided by the generally quadrant-shaped sidewall 330 of the door which includes a contoured margin 344. The cradle actuating rod 342 is selectively engageable with and seats on the contoured margin 344 as is illustrated in FIG. 11, to hold the cradle 334 with its transverse rod 340 in the first position out of the path of the container seated on the lower ramp assembly 90 to allow transfer of the container to the associated door bin when the door 324 is closed. When the door 324 is moved from the closed position, the actuating rod 342 moves into the relatively recessed margin portion 344, thereby allowing pivotal movement of the upper cradle 334 so that the transverse rod 340 moves downwardly and is located in its second position in the path of the container to preclude transfer of the container from the rack assembly 90. A door assembly and control means of the type described and disclosed in Ser. No. 451,035 and Ser. No. 451,454 which are incorporated herein by reference.

It is thought that the structural features and functional advantages of this rack assembly have become fully apparent from the foregoing description of parts, but for completeness of disclosure the installation and operation of the device will be briefly described.

It will be understood that the rack assembly 10 mounted in the cabinet 12 as shown in FIG. 2 provides a means of storing beverage containers and the like in a plurality of compartments, three in the embodiment shown, said compartments being substantially identical to each other. The rack assembly 10 is formed from complementary rack portions 14 and 16 which are connected together in face to face relation on a plane generally indicated by P in FIG. 2, the connection means being provided by fasteners such as self tapping screws 116 shown in FIG. 3. When the rack portions 14 and 16 are connected together the front plate 320 is connected between the lower ends of the rack portions 14 and 16 and the rack assembly 10 as a whole is mounted within the cabinet 12 by means of cooperating bracket elements 100 and 101 provided on the rack assembly and the cabinet respectively.

The compartments 1, 2 and 3 are generally serpentine in configuration and include by an upper platform assembly 170 on the second rack portion 16 defining an entry opening and a plurality of alternating ramp assemblies 70, 80, 81 and 90 on the first rack portion and 180, 181 and 190 on the second rack portion said assemblies providing inwardly projecting downwardly inclined upper container-receiving faces. The side frame members 18 and 118 of both rack portions and the intermediate frame members 20 and 120 of both rack portion are flanged to preclude sideways movement of the containers within the compartment. By the same token, vertical retaining members 104, 106 and 108 on the first rack portion and 204, 206 and 208 on the second rack portion provide outer retaining means. The latticework construction thus formed provides a relatively lightweight rack assembly easily circulated by cool air within the cabinet and providing latice work openings which are sufficiently smaller than the smallest container dimension to preclude inadvertent outward movement of the containers from the rack.

The rack can easily be filled from the upper end by an operator by simply inserting containers within the upper end of each compartment and allowing them to roll in a serpentine path down the ramp members to the lower end of the rack assembly. The first container C1 is received within the bin of the door 324. The second container C2 comes to rest against the first container C1 and, because of its weight, moves the lower cradle stop member upwardly into engagement with the third container C3 thereby spacing it from the container C2 and transferring its weight to the cradle 300. The remaining containers C4, C5 etc. rest upon each other so that even when the rack assembly is filled only the weight of containers C1 and C2 bears against the door structure.

When it is desired to dispense a container from the rack assembly the door 322 is opened. Because of the contoured margin of the door sidewall 330, the transverse rod 340 of the upper cradle 334 is moved downwardly as shown in FIG. 10 to engage and preclude further movement of the container C2. When the door is closed the upper cradle actuating rod 342 is moved upwardly under the canning action of the sidewall so that when the door is in the closed position the transverse rod is sufficiently high relative to the height of container C2 so that, as shown in FIG. 11, container C2 moves from the lower ramp assembly 90 into the bin. Because the weight of the container C2 is momentarily relieved from the lower cradle 300, the rear end of said cradle moves downwardly permitting travel of the container C3 down the ramp assembly 90 and into engagement with the container C2. At this this time the weight of the container C3 on the front end of the cradle 300 moves the rear end of the cradle upwardly and into engagement with the container C4 resulting in the disposition of parts shown in FIG. 2 but with containers C2, C3 and C4 respectively replacing containers C1, C2 and C3. At this time the rack assembly is in condition for dispensing the next container.

We claim as our invention:

1. A dispensing rack assembly for a container dispensing machine, the rack assembly comprising:

(a) a first molded rack portion including:
  1. a pair of upright frame members including an outer portion and an inner portion,
  2. a plurality of ramp means disposed between said frame members in spaced vertical relation each having an inwardly projecting, downwardly inclined upper face, (b) a second molded rack portion including:
  1. a pair of upright frame members including an outer portion and an inner portion,
  2. a plurality of ramp means disposed between said frame members in spaced vertical relation each having an inwardly projecting, downwardly inclined upper face, and (c) means connecting said first and second rack portions together along a connection plane extending generally transversely between said upright frame members with the ramp means of one rack being disposed in staggered relation to the ramp means of the other rack to define at least one container-receiving compartment providing a serpentine path for the containers.

2. A rack assembly as defined in claim 1, in which:

(d) the first rack portion includes a lower ramp means and container engageable cradle means associated with said lower ramp means and rotatable by container load, selectively permitting and precluding forward movement of the containers into the dispensing area.

3. A rack assembly as defined in claim 2, in which:

(e) said cradle means includes pivot means, having a transversely disposed pivot axis, a container-carrying bearing portion disposed forwardly of the pivot axis and a container-engageable stop portion disposed rearwardly of the pivot axis, said cradle means including biasing means tending to move the stop portion out of container engagement when the bearing portion is relieved of container load, said stop portion tending to move into container engagement when the bearing portion is under container load.

4. A rack assembly as defined in claim 1, which:

(d) the second rack portion includes upper guide means between said upright frame members disposed above the ramp means of the second rack portion and spaced from the first rack portion to provide a container-entry opening.

5. A rack assembly as defined in claim 1, in which:

(d) the first rack portion frame members include outwardly extending container-retaining means disposed in vertically spaced relation between each ramp means for precluding sideways movement of the containers, and (e) the second rack portion frame members include outwardly extending container-retaining means disposed in vertically spaced relation above each ramp means for precluding sideways movement of the containers.

6. A rack assembly as defined in claim 5, in which:

(f) the second rack portion includes upper guide means between said upright frame members disposed above the ramp means of said second rack means, and (g) the second rack portion include outwardly disposed container-retaining means disposed in vertically spaced relation between said upper guide means and the upper ramp means.

7. A rack assembly as defined in claim 1, in which:

(d) the first rack portion includes outwardly disposed generally vertical horizontally spaced container-retaining means disposed in vertically spaced relation between the ramp means for precluding outward movement of the containers, and (e) the second rack portion includes outwardly disposed generally vertical horizontally spaced container-retaining means disposed in vertically spaced relation between the ramp means for precluding outward movement of the containers.

8. A rack assembly as defined in claim 1, in which:

(d) the first rack portion includes a plurality of forwardly projecting arms providing a base for supporting the rack assembly.

9. A rack assembly as defined in claim 1, in which:

(d) the first and second rack portions are of lattice work construction.

10. A dispensing rack assembly for a container dispensing machine, the rack assembly comprising:

(a) a first molded rack portion including:

1. a pair of upright frame members including an outer portion and an inner portion, 2. a plurality of ramp means disposed in spaced vertical relation each having an inwardly projecting, downwardly inclined upper face, (b) a second molded rack portion including:

1. a pair of upright frame members including an outer portion and an inner portion, 2. a plurality of ramp means disposed in spaced vertical relation each having an inwardly projecting, downwardly inclined upper face, (c) means connecting said first and second rack portions together with the ramp means of one rack beingdisposed in overlapped, staggered relation to the ramp means of the other rack to define at least one container-receiving compartment providing a serpentine path for the containers, (d) the first and second rack portions including interengageable contact faces, and (e) the ramp means of each rack portion extending beyond the contact face.

11. A dispensing rack assembly for a container dispensing machine, the rack assembly comprising:

(a) a first molded rack portion including:

1. a pair of upright frame members including an outer portion and an inner portion, 2. a plurality of ramp means disposed in spaced vertical relation each having an inwardly projecting, downwardly inclined upper face, (b) a second molded rack portion including:

1. a pair of upright frame members including an outer portion and an inner portion, 2. a plurality of ramp means disposed in spaced vertical relation each having an inwardly-projecting, downwardly inclined upper face, (c) means connecting said first and second rack portions together with the ramp means of one rack being disposed in overlapped, staggered relation to the ramp means of the other rack to define at least one container-receiving compartment providing a serpentine path for the containers, (d) the first rack portion including a pair of side frame members and at least one intermediate frame member each of said frame members including an outer portion and an inner portion, (e) the second rack portion including a pair of side frame members and at least one intermediate frame member each of said frame members including an outer portion and an inner portion, (f) the first rack portion ramp means including transversely aligned ramp portions attached to each side frame member and to each side of each intermediate frame member, (g) the second rack portion ramp means including transversely aligned ramp portions attached to each side frame member and to each side of each intermediate frame member, and (h) the side frames and the intermediate frames of the first and second rack portions cooperating to define a plurality of container-receiving compartments.

12. A dispensing rack assembly for a container dispensing machine, the rack assembly comprising:

(a) a first molded rack portion including:

1. a pair of upright frame members including an outer portion and an inner portion, 2. a plurality of ramp means disposed in spaced vertical relation each having an inwardly projecting, downwardly inclined upper face, (b) a second molded rack portion including:

1. a pair of upright frame members including an outer portion and an inner portion, 2. a plurality of ramp means disposed in spaced vertical relation each having an inwardly projecting, downwardly inclined upper face, (c) means connecting said first and second rack portions together with the ramp means of one rack being disposed in overlapped, staggered relation to the ramp means of the other rack to define at least one container-receiving compartment providing a serpentine path for the containers, (d) the first rack portion including a lower ramp means and container engageable cradle means associated with said lower ramp means, selectively permitting and precluding forward movement of the containers into the dispensing area, (e) said cradle means including pivot means having a transversely disposed pivot axis, a container-carrying bearing portion disposed forwardly of the pivot axis and a container-engageable stop portion disposed rearwardly of the pivot axis, said cradle means including biasing means tending to move the stop portion out of container engagement when the bearing portion is relieved of container load, said stop portion tending to move into container engagement when the bearing portion is under container load, and (f) a face plate is disposed forwardly of the lower ramp means including a door opening, (g) a door is hinged to the face plate below the opening said door including a bottom plate and a side plate defining a container-receiving bin, said door being selectively movable between an open position and a closed position, (h) stop means actuated by the door and selectively engaging a container on the cradle while the door is in the open position and permitting passage of the container into the bin when the door is in the closed position.

13. A dispensing rack assembly for a container dispensing machine, the rack assembly comprising:

(a) a first molded rack portion including:

1. a pair of upright side frame members and at least one intermediate frame member, 2. upper ramp means providing a plurality of transversely aligned ramp portions one attached to one side the side frame members and one attached to each side of the intermediate frame members,
3. lower ramp means providing a plurality of transversely aligned ramp portions one attached to one side of each side frame members and one attached to each side of the intermediate frame member,
4. a plurality of intermediate ramp means each providing a plurality of transversely aligned ramp portions one attached to one side of the side frame members and one attached to each side of the intermediatae frame member, (b) a second molded rack portion including:
1. a pair of upright side frame members and at least one intermediate frame member,
2. an upper guide means between said frame members and spaced from the first rack portion to provide container entry openings,
3. lower ramp means providing a plurality of transversely aligned ramp portions one attached to one side of each side frame member and one attached to each side of the intermediate frame member,
4. a plurality of intermediate ramp means each providing a plurality of transversely aligned ramp portions, one attached to one side of the side frame member and one attached to each side of the intermediate frame member, (c) the first and second rack portions including interengageable contact faces and the ramp means of each rack portion include a nose portion extending beyond the contact face, (d) means connecting said first and second rack portions together with the ramp means of one rack being disposed in overlapped, staggered relation to the ramp means of the other rack to define a plurality of container-receiving compartments each providing a serpentine path for the containers, and (e) a plurality of cradles each associated with a container-receiving opening and mounted between opposed lower ramp portions of the first rack portion, each cradle including pivot means having a transversely disposed pivot axis, a container-carrying bearing portion disposed forwardly of the pivot axis and a container-engageable stop portion disposed rearwardly of the pivot axis said cradle including biasing means tending to move the stop portion out of container engagement when the bearing portion is relieved of container load, said stop portion tending to move into container engagement when the bearing portion is under container load.

(f) a face plate disposed forwardly of the lower ramp means and including a plurality of door openings each associated with each container-receiving compartment, (g) a plurality of doors each hinged to the plate below a door opening, each door including a bottom plate and a side plate defining a container-receiving bin and each door being selectively movable between an open position and a closed position, and (h) a plurality of stop means actuated by an associated door and selectively engaging the containers on an associated cradle while the door is in the open position and permitting passage of the container into the associated bin when the door is in the closed position.

14. A dispensing rack assembly for a container dispensing machine, the rack assembly comprising:

(a) a first molded rack portion including:
1. opposed side portions an outer portion and an inner portion,
2. a plurality of ramp means disposed in spaced vertical relation between said side portions each having a downwardly inclined upper face, (b) a second molded rack portion including:
1. opposed side portions, an outer portion and an inner portion,
2. a plurality of ramp means disposed in spaced vertical relation between said side portions each having a downwardly inclined upper face, (c) means connecting said first and second rack portions together being to define at least one container-receiving compartment providing a serpentine path for the containers, (d) the connected rack portions including a lower ramp means and container engageable cradle means associated with said lower ramp means and rotatable by container load, selectively permitting and precluding forward movement of the containers into the dispensing area, (e) a face plate disposed forwardly of the lower ramp means including a door opening, (f) a door hinged to the face plate below the opening said door including a bottom plate and a side plate defining a container-receiving bin, said door being selectively movable between an open position and a closed position, and (g) stop means actuated by the door selectively engaging a container on the cradle means while the door is in the open position and permits passage of the container in to the bin when the door is in the closed position.

* * * * *

UNITED STATES PATENT AND TRADEMARK OFFICE

CERTIFICATE OF CORRECTION

PATENT NO. : 4,586,633

DATED : May 6, 1986

INVENTOR(S) : Charlie R. Holland and Michael J. DelPercio

It is certified that error appears in the above-identified patent and that said Letters Patent are hereby corrected as shown below:

Column 3, line 39 delete "82" and insert --81--.
Column 4, line 13 after "bers" insert --18--.
Column 4, line 35 delete "140" and insert --142--.
Column 4, line 54 delete "84" and insert --184--.
Column 5, line 5 delete "102" and insert --202--.

Signed and Sealed this

*Nineteenth* Day of *August 1986*

[SEAL]

*Attest:*

DONALD J. QUIGG

*Attesting Officer* *Commissioner of Patents and Trademarks*